Nov. 29, 1927. 1,650,961
A. ROTHMAN
CAR SEAT HANDLE
Filed Dec. 1, 1926
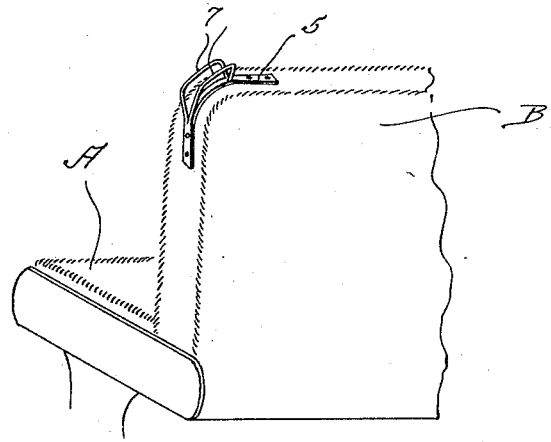
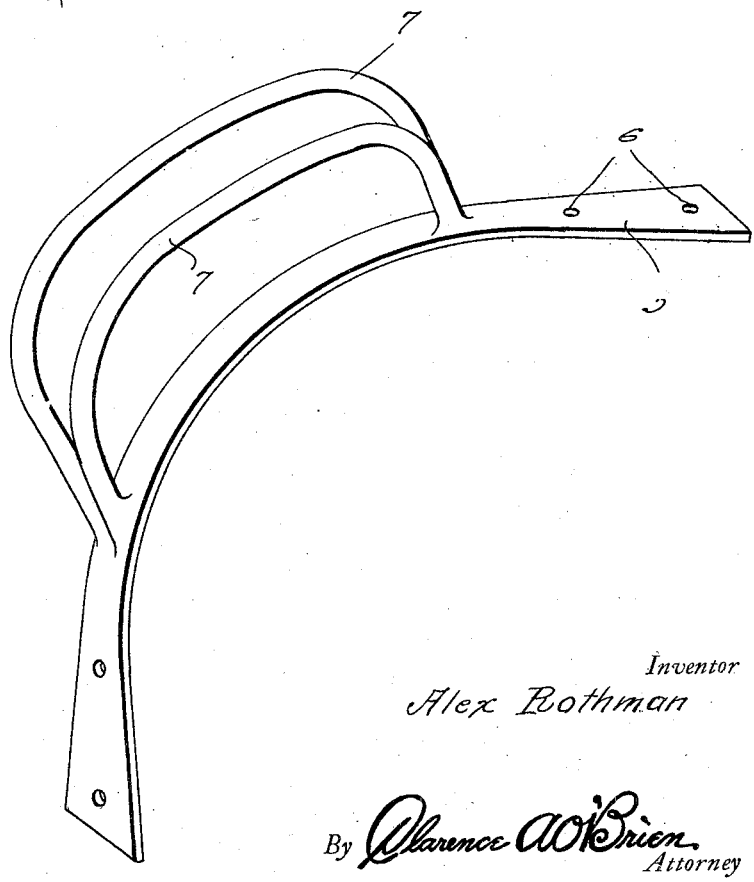
Inventor
Alex Rothman
By Clarence A. O'Brien
Attorney Patented Nov. 29, 1927.

1,650,961

UNITED STATES PATENT OFFICE.

ALEX ROTHMAN, OF NEW YORK, N. Y.

CAR-SEAT HANDLE.

Application filed December 1, 1926. Serial No. 151,957.

This invention relates to new and useful improvements in handles constructed for attachment to the outer corners of the back rests of car seats when the same are arranged transversely at opposite sides of the car.

The primary object of the invention resides in the provision of an article of this character that consists of but a single element that is constructed for providing two handle members in contra-distinction to the usual single handle member now universally in use.

Obviously, the end in view is to provide a handle of this character that may be grasped by two of the standing passengers with the result that all the standing passengers will be enabled to support themselves when the car jerks or comes to an abrupt stop as well as making turns and the like.

In the drawing wherein like reference characters indicate corresponding parts in both of the views:

Figure 1 is a fragmentary rear side perspective of a conventional car seat equipped with my improved handle, and Figure 2 is a perspective of the handle per se.

Now having particular reference to the drawing there is disclosed in Figure 1 a generally conventional type of car seat A having the usual hinged back rest B. My invention per se consists of a metallic strap 5 curved to conform to the curvature of the outer corner of the seat back rest B so as to have flush engagement therewith as disclosed in Figure 1. This strap is formed at its ends with spaced openings 6 in order that the same may be rigidly bolted or otherwise secured to the back rest.

Formed or otherwise associated with the metallic strap directly at the corner thereof is a pair of vertically extending outwardly converging U-shaped handle members 7—7. The gripping bars of these handles are so spaced as to permit two passengers to grasp the handles without any danger of the passengers' hands being in continuous contact.

It will thus be seen that I have provided a highly novel, simple, and efficient car seat handle that is well adapted for all the purposes heretofore designated, and even though I have herein shown and described the invention as consisting of a certain formation of handles, it is nevertheless to be understood that some changes may be made therein without affecting the spirit and scope of the appended claims.

Having thus described the invention, what I claim as new is:—

1. As a new article of manufacture, a car seat handle comprising a strap member constructed to conform to the curvature of the outer upper corner of the car seat back rest and being rigidly attached thereto, a pair of relatively U-shaped individual handle members extending upwardly from the corner engaging portion of the strap in diverging relation.

2. As a new article of manufacture, a car seat handle comprising a strap member constructed to conform to the curvature of the outer upper corner of the car seat back rest and being rigidly attached thereto, a pair of relatively U-shaped individual handle members extending upwardly from the corner engaging portion of the strap in diverging relation, said individual handle members being rigidly connected to the strap.

In testimony whereof I affix my signature.

ALEX ROTHMAN.